United States Patent
Trecker et al.

[15] 3,678,096

[45] July 18, 1972

[54] OXIDATION PROCESS FOR THE SYNTHESIS OF α-HYDROXY ESTERS

[72] Inventors: David J. Trecker, South Charleston, W. Va.; James E. McKeon, Thornwood, N.Y.

[73] Assignee: Union Carbide Corporation, New York, N.Y.

[22] Filed: Aug. 12, 1969

[21] Appl. No.: 849,515

[52] U.S. Cl.................260/484 R, 260/410.9, 260/468 R, 260/468 B, 260/473 A, 260/479 S, 260/483, 260/485 R, 260/486 D
[51] Int. Cl........................................................C07c 69/66
[58] Field of Search.................260/484, 468, 473, 610 R

[56] References Cited

UNITED STATES PATENTS 2,782,219   2/1957   Cleaver..............................260/484 X Primary Examiner—Lorraine A. Weinberger
Assistant Examiner—Paul J. Killos
Attorney—Paul A. Rose and Louis C. Smith, Jr.

[57] ABSTRACT

A process for the synthesis of α-hydroxy esters of carboxylic acids by reacting a carboxylic acid ester with a hydroperoxide in the presence of a metal ion catalyst. The reaction is characterized by mild reaction conditions and good efficiency. The α-hydroxy esters are useful intermediates in the production of acrylates.

8 Claims, No Drawings

OXIDATION PROCESS FOR THE SYNTHESIS OF α-HYDROXY ESTERS

This invention relates to the production of α-hydroxy esters.

The formation of both α-hydroxy esters and α-hydroxy acids in good yields on a large scale is particularly desirable, for these compounds serve as intermediates in the formation of acrylates. The α-hydroxy esters or acids can be subsequently dehydrated to give the corresponding acrylate or acrylic acid.

Methods for making these useful intermediates have taken a variety of forms. For instance, α-hydroxy isobutyric acid has been prepared by reacting t-butyl alcohol or isobutylene with an excess of fuming nitric acid or dinitrogen tetroxide. However, the special handling required of the corrosive materials involved and the vigorous reaction conditions are deterrents to the use of this reaction.

Methacrylic acid has been produced by the oxidation of methacrolein manufactured by the air-oxidation of isobutylene while employing heterogenous catalysis. This reaction is noted for its randomness and also for its predisposition to form unwanted intermediate products which lend themselves to still further desirable side reactions.

Methyl α-hydroxy isobutyrate, which upon dehydration forms methyl methacrylate, has been produced by the air-oxidation of methyl isobutyrate. A disadvantage of the reaction is its low yields, which are caused by the randomness of the reaction.

It is an object of this invention to produce acrylate intermediates in high yields.

It is another object of this invention to produce acrylate intermediates using mild reaction conditions.

It is yet another object of this invention to produce acrylate intermediates in high yields while using mild reaction conditions.

These and other objects will become obvious by the following description of the invention.

It has now been found that α-hydroxy esters can be produced by contacting an ester of a carboxylic acid with a hydroperoxide in the presence of a metal ion catalyst while in the liquid phase. This novel process involves mild oxidation conditions, but nevertheless renders a high selectivity. More particularly, the oxidation process concerns contacting an ester of a carboxylic acid with a hydroperoxide in the presence of a metal ion catalyst selected from the Group 4B, 5B, 6B, 7B, 8 and 1B metals, with Group 7A and 8 metals preferred. It is imperative that the carboxylic acid ester utilized have at least one hydrogen atom on the carbon adjacent to the carbonyl of the ester function in order to allow oxidation to take place.

A preferred embodiment of the reaction, the formation of methyl α-hydroxy isobutyrate from methyl isobutyrate, is graphically shown below:

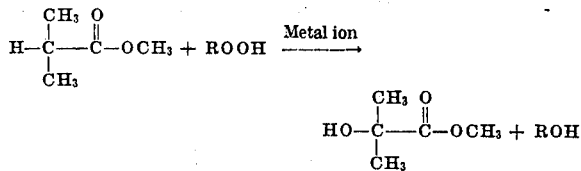

The process is applicable to any aliphatic ester of a carboxylic acid which contains at least one hydrogen atom on the carbon adjacent to the ester carbonyl group. Various examples of the scope of the invention, setting forth the ester and the resulting α-hydroxy ester are tabulated below.

| Ester | Resulting α-Hydroxy Ester |
|---|---|
| n-Butyl isobutyrate | n-Butyl α-hydroxyisobutyrate |
| Phenyl isobutyrate | Phenyl α-hydroxyisobutyrate |
| Ethyl propionate | Ethyl α-hydroxperpionate |
| | Ethyl pyruvate |
| Methyl octanoate | Methyl α-hydroxyoctanoate |
| | Methyl α-ketooctanoate |
| Methyl 2-ethylbutyrate | Methyl 2-hydroxy-2-ethylbutyrate |
| Methyl 3-phenylpropionate | Methyl 2-hydroxy 3-phenylhpropionate |
| | Methyl 3-phenylpyruvate |
| 2-endo-Carbomethoxynorbornane | 2-exo-Hydroxy-2-endo-carbomethoxynorbornane |
| Methyl cyclohexane carboxylate | Methyl 1-hydroxy-cyclohexane-1Carboxylate |

Hydroperoxides which may be used in the process of this invention include ethyl hydroperoxide, n-propyl hydroperoxide, t-butyl hydroperoxide, t-amyl hydroperoxide, cumene hydroperoxide, benzyl hydroperoxide, 1tetralin hydroperoxide, p-tolyl hydro-peroxide, and the like. The tertiary hydroperoxides such as t-butyl hydroperoxide, t-amyl hydroperoxide, and cumene hydroperoxide are particularly effective.

Various metal ion catalysts from Groups 4B, 5B, 6B, 7B, 8 and 1B shown to be useful in the invention include dicyclopentadienyl titanium dichloride, vanadyl acetylacetonate, vanadic trioctanoate, chromium triacetate, chromoyl caproate, manganic stearate, ferrous stannate, ferric acetylacetonate, cobalt octanoate, cobalt naphthenate, cuprous acetate, cupric acetate, manganic acetylacetonate, vanadium oxyacetylacetonate, nickel(II) acetylacetonate, cerium(II) acetate, and the like. The manganese and cobalt salts are especially preferred.

It has been found that the best working combination is the coupling of t-butyl hydroperoxide as the oxidant with cobalt naphthenate as the catalyst.

The reaction is carried out generally by mixing in the liquid phase the aliphatic ester of the carboxylic acid, the hydroperoxide, and the metal ion catalyst. There are four alternatives for the mixing process; the ingredients can be mixed together simultaneously, the catalyst can be added incrementally to a solution of the ester and peroxide, the hydroperoxide can be added incrementally to a solution of the ester and catalyst, or the catalyst and ester can be added portionwise to the hydroperoxide. The preferred method is to add the catalyst in increments to a solution of ester and hydroperoxide. The mole ratio of hydroperoxide: ester can range from 5 to 0.01, with a preferred range of 2 to 0.05 and a most preferred range of 1 to 0.1. The ratio of catalyst: hydroperoxide can range from 1 to 0.00001; preferred is a range between 0.1 and 0.0001 and most preferred is a range of 0.01 to 0.001.

The reaction must be carried out in the liquid phase and, although a solvent is not required, an inert reaction medium can be employed. The best solvents are those which do not coordinate with the metal catalysts or react with the hydroperoxides. It is convenient to use the alcohol corresponding to the hydroperoxide employed; for example, t-butyl alcohol is used when t-butyl hydroperoxide is used as the oxidant.

The reaction can be carried out at any temperature between −30° and 120° C., bearing in mind that the reaction solution is to remain liquid at all times. The preferred temperature range is 0° to 100° C. and the most preferred range is 20° to 60° C. It is very convenient in practice to carry out the reaction at ambient conditions.

The reaction may be carried out in air, in an enriched oxygen atmosphere, or in an inert atmosphere such as nitrogen, argon or helium. There appears to be no advantage in conducting the reaction in any sort of artificial atmosphere. The resulting α-hydroxy ester is isolated by using fractional distillation.

After the α-hydroxy ester has been isolated, it can easily be converted to the corresponding acrylate by dehydration, such as methyl α-hydroxyisobutyrate changed to methyl methacrylate as described in U.S. Pat. No. 2,303,842; Ger. Pat. No. 1,795,295; Ger. Pat. No. 1,191,367; and Fr. Pat. No. 1,215,702. Any of these several known procedures can be used. The acrylate then can be vinyl polymerized to the polyacrylate such as poly(methyl methacrylate). Poly(methyl methacrylate) is currently produced on a multimillion pound a year basis for use in castings and moldings which call for high clarity, strength and light weight. It is used in windshields, safety shields, and various automobile parts. The acrylics, in general, are also used as adhesives and in coatings. Acrylic emulsions are used as leather and textile finishes and the clear coatings are used as polished metal finishes. Enamels based upon the acrylics are useful for heat and fume resistance applications.

For the working examples, the oxidation involved a simple liquid phase treatment of methyl isobutyrate with t-butyl hydroperoxide and various metal ions. Nine metal species were scanned with the results summarized in Table I. Dimethyl tetramethyl succinate, a radical coupling product, was always formed as a minor coproduct as shown in the following reaction.

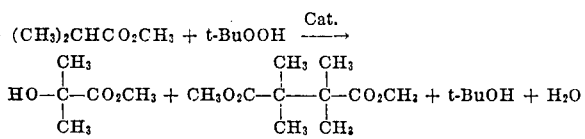

The effect of low (−60° C), ambient (25° C), and moderately high (95° C) temperatures was tested with six metal ion catalysts. The results shown in Table II, indicate that the reaction proceeded in highest yields at ambient temperature.

A two-fold enhancement of hydroperoxide concentration resulted in a slight improvement in the yield of methyl α-hydroxy-isobutyrate, while a five-fold increase in the cobalt(II) concentration seemed to be slightly deleterious. However, these results were relatively small, as shown in Table III. Incremental addition of the catalyst over a prolonged reaction period substantially improved the yield of methyl α-hydroxyisobutyrate. These results, compiled in Table IV, indicated that at ester conversions of ca 6 percent, methyl α-hydroxyisobutyrate could be obtained in efficiencies of 84–88 percent, based on ester, and 44–46 percent, based on hydroperoxide.

The treatment of methyl isobutyrate with t-butyl hydroperoxide alone at room temperature, as well as the treatment of methyl isobutyrate with a metal ion catalyst alone, gave no reaction whatsoever. However, the uncatalyzed reaction of t-butyl hydroperoxide with methyl isobutyrate at elevated temperatures (>120° C) resulted in the formation of methyl α-hydroxyisobutyrate and dimethyl tetramethyl succinate, usually in comparable amounts. Similarly, the ultraviolet radiation of methyl isobutyrate and t-butyl hydroperoxide gave rise to moderately good yields of methyl α-hydroxyisobutyrate and dimethyl tetramethyl succinate. These runs are summarized in Table V. It will be noted that, in all these instances, the selectivity of methyl α-hydroxyisobutyrate which was obtained with metal ion catalysts was lacking.

The methyl α-hydroxyisobutyrate was isolated and identified by collection at 69° C. (30 mm) using fractional distillation. The infrared spectrum showed O—H stretching (3,250 cm$^{-1}$) and an ester carbonyl absorption (1,728 cm$^{-1}$). The N.M.R. spectrum of methyl α-hydroxyisobutyrate confirmed its assigned structure.

Although the working examples show only the conversion of methyl isobutyrate to methyl α-hydroxyisobutyrate, the process is applicable for the conversion of any carboxylic acid ester having at least one hydrogen atom on the carbon adjacent to the carbonyl of the ester function.

TABLE I.—EFFECT OF VARYING METAL CATALYST

| Example | Metal catalyst | Mole ratio [a] | Conditions | Reaction time, hours | Methyl α-hydroxyisobutyrate,[b] percent | Dimethyl tetramethyl succinate,[b] percent |
|---|---|---|---|---|---|---|
| 1 | Co$^{III}$ naphthenate | 5:1:0.002 | Room temperature | 2 | 13.4 | 1.2 |
| 2 | V$^{II}$ (Acac)$_2$ | 5:1:0.008 | do | 2 | 4.4 | 1.9 |
| 3 | Fe$^{III}$ (Acac)$_3$ | 5:1:0.006 | do | 2 | 5.5 | 2.0 |
| 4 | Cr$^{III}$ (OAc)$_3$ | 5:1:0.012 | do | 2 | 5.5 | 1.0 |
| 5 | Mn$^{III}$ (Acac)$_3$ | 5:1:0.006 | do | 2 | 12.0 | Trace |
| 6 | Ni$^{II}$ (Acac)$_2$ | 5:1:0.008 | do | 2 | Trace | 1.1 |
| 7 | Ti$^{IV}$ (C$_5$H$_5$) Cl$_2$ | 5:1:0.008 | do | 2 | Trace | Trace |
| 8 | Cu$^{I}$ OAc | 5:1:0.016 | do | 2 | 2.1 | Trace |
| 9 | Ce$^{III}$ (OAc)$_3$ | 7.8:1:0.010 | do | 2 | 5.4 | Trace |

[a] Methyl isobutyrate:t-BuOOH: metal.
[b] Yield, based on starting t-BuOOH.

TABLE II.—EFFECT OF TEMPERATURE

| Example | Metal catalyst | Mole ratio[1] | Temperature, °C. | Reaction time, hours | Methyl α-hydroxyisobutyrate,[2] percent | Dimethyl tetramethyl succinate,[2] percent |
|---|---|---|---|---|---|---|
| 1a | Co$^{II}$ naphthenate | 7.8:1:0.003 | −6 | 16 | Trace | [3] |
| 1b | Co$^{II}$ naphthenate | 5:1:0.002 | 25 | 16 | 15.6 | [3] |
| 1c | Co$^{II}$ naphthenate | 5:1:0.002 | 95 | 16 | 10.6 | 1.1 |
| 2a | Mn$^{III}$ (Acac)$_3$ | 7.8:1:0.009 | −6 | 84 | 6.3 | [3] |
| 2b | Mn$^{III}$ (Acac)$_3$ | 5:1:0.006 | 25 | 16 | 13.0 | [3] |
| 2c | Mn$^{III}$ (Acac)$_3$ | 5:1:0.006 | 95 | 16 | 11.3 | Trace |
| 3a | Fe$^{III}$ (Acac)$_3$ | 5:1:0.006 | 25 | 2 | 5.5 | 2.0 |
| 3b | Fe$^{III}$ (Acac)$_3$ | 5:1:0.006 | 95 | 16 | 6.0 | 1.7 |
| 4a | Cr$^{III}$ (OAc)$_3$ | 5:1:0.012 | 25 | 2 | 5.5 | 1.0 |
| 4b | Cr$^{III}$ (OAc)$_3$ | 5:1:0.012 | 95 | 16 | 10.4 | 1.5 |
| 5a | Ni$^{II}$ (Acac)$_2$ | 5:1:0.008 | 25 | 2 | Trace | 1.1 |
| 5b | Ni$^{II}$ (Acac)$_2$ | 5:1:0.008 | 95 | 16 | Trace | 1.3 |
| 6a | Ti$^{IV}$ (C$_5$H$_5$)$_2$Cl$_2$ | 5:1:0.008 | 25 | 2 | Trace | |
| 6b | Ti$^{IV}$ (C$_5$H$_5$)$_2$Cl$_2$ | 5:1:0.008 | 95 | 16 | Trace | |

[1] Methyl isobutyrate:t-BuOOH:metal.
[2] Yield, based on starting t-BuOOH.
[3] Not determined.

TABLE III

[Effect of catalyst concentration and hydroperoxide concentration]

| Example | Metal catalyst | Mole ratio[a] | Temperature, °C. | Reaction time, hrs. | Methyl α-hydroxyisobutyrate[b], percent | Dimethyl tetramethyl succinate[b] |
|---|---|---|---|---|---|---|
| 1 | Co$^{II}$ naphthenate | 5:1:0.002 | 25 | 45 | 20.4 | 1.5% |
| 2 | Co$^{II}$ naphthenate | 5:1:0.010 | 25 | 72 | 17.3 | [c] |
| 3 | Co$^{II}$ naphthenate | 5:2:0.002 | 25 | 46 | 23.3 | [c] |

[a] Methyl isobutyrate:t-BuOOH:metal.
[b] Yield, based on starting t-BuOOH.
[c] Not determined.

TABLE IV

[Effect of incremental addition of hydroperoxide and of metal catalyst]

| Example | Metal catalyst | Mole ratio [a] | Conditions | Yield of methyl α-hydroxy-isobutyrate, percent | Efficiency to methyl α-hydroxyisobutyrate, percent [b] | Efficiency to methyl α-hydroxyisobutyrate, percent [c] |
|---|---|---|---|---|---|---|
| 1 | Co<sup>II</sup> naphthenate | 7.7:1:0.005 | Co<sup>II</sup> was added gradually over a period of 72 hrs | 39.0 | 87.7 | 43.7 |
| 2 | Mn<sup>III</sup>(Acac)₃ | 7.7:1:0.015 | Mn<sup>III</sup> was added gradually over a period of 72 hrs | 35.1 | 83.7 | 46.1 |
| 3 | Ce<sup>III</sup>(OAc)₃ | 7.7:1:0.20 | Ce<sup>III</sup> was added gradually over a period of 72 hrs | 6.6 | (e) | (e) |
| 4 | Cu<sup>I</sup> OAc | 7.7:1:0.042 | Cu<sup>I</sup> was added gradually over a period of 72 hrs | 5.8 | (e) | (e) |

[a] Methyl isobutyrate:t-BuOOH:metal.
[b] Based on methyl isobutyrate.
[c] Based on t-BuOOH.
[d] Determined after 72 hrs.
[e] Unreliable conditions, due to low conversion to methyl α-hydroxyisobutyrate.

TABLE V

[Uncatalyzed runs:effect of heat and ultraviolet light]

| Example | Mole ratio [a] | Conditions, °C. | Reaction time, hours | Methyl α-hydroxyisobutyrate,[b] percent | Dimethyl tetramethyl succinate,[b] percent |
|---|---|---|---|---|---|
| 1 | 8.9:1 | 150 | 12 | 20.6 | 32.3 |
| 2 | 8.9:1 | 150 | 12 | 13.6 | 27.1 |
| 3 | 8.9:1 | 120 | 40 | 2.5 | 3.6 |
| 4 | 17.8:1 | 120 | 40 | 3.9 | 6.5 |
| 5 | 8.9:1 | 120 | 40 | 9.0 | 8.9 |
| 6 | 18.1:1 | U.V. light,[c] 25 | 72 | 33.1 | 31.0 |

[a] Methyl isobutyrate:t-BuOOH.
[b] Yield, based on starting t-BuOOH.
[c] 100-watt medium-pressure mercury arc; Vycor optics.

What is claimed is:

1. A method for synthesizing α-hydroxy esters from aliphatic or phenyl esters of carboxylic acids having at least one hydrogen atom on the carbon adjacent to the carbonyl function of the ester which comprises reacting said carboxylic acid ester in the liquid phase with a hydroperoxide, in the presence of a metal ion catalyst selected from the group consisting of Group 4B, 5B, 6B, 7B, 8, and 1B metals.

2. The method according to claim 1 wherein said hydroperoxide is a tertiary hydroperoxide.

3. The method according to claim 1 wherein said metal ion catalyst is selected from the group consisting of the Group 7B and 8 metals.

4. The method according to claim 1 wherein said metal ion catalyst is selected from the group consisting of cobalt and manganese catalysts.

5. The method according to claim 1 wherein said carboxylic acid ester is methyl isobutyrate.

6. The method according to claim 5 wherein said hydroperoxide is t-butyl hydroperoxide, and said metal ion catalyst is cobalt(II) naphthenate.

7. A method for synthesizing α-hydroxy esters from aliphatic or phenyl esters of carboxylic acids having at least one active hydrogen atom on the carbon adjacent to the carbonyl function of the ester which comprises reacting said carboxylic acid ester in the liquid phase with a hydroperoxide in the presence of a metal ion catalyst selected from the group consisting of Group 4B, 5B, 6B, 7B, 8 and 1B metals wherein said catalyst is added incrementally to a solution of said hydroperoxide and said carboxylic acid ester.

8. A method for synthesizing α-hydroxy esters from aliphatic or phenyl esters of carboxylic acids having at least one active hydrogen atom on the carbon adjacent to the carbonyl function of the ester which comprises reacting said carboxylic acid ester in the liquid phase with a hydroperoxide in the presence of a metal ion catalyst selected from the group consisting of Group 4B, 5B, 6B, 7B, 8 and 1B metals, said reaction being carried out under ambient conditions.

* * * * *